May 20, 1952  E. BOBARD  2,597,436
MOTOR CONTAINING WHEEL
Original Filed March 15, 1945
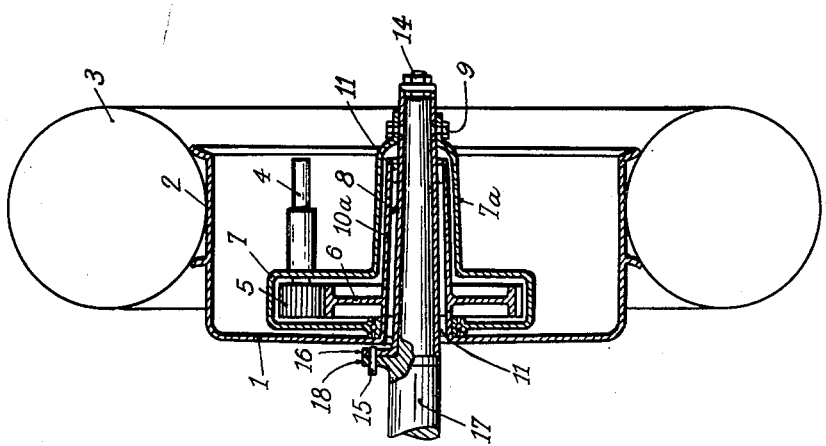
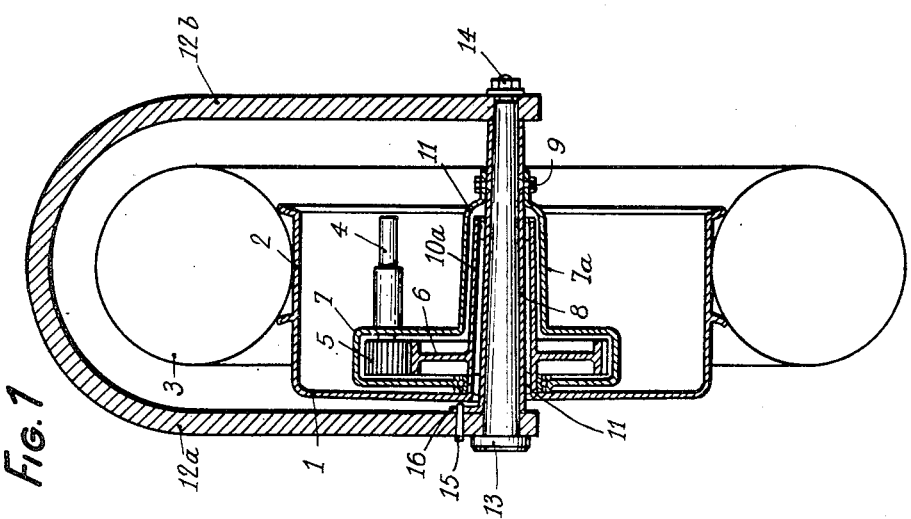
INVENTOR
Emile Bobard.
By his attorneys
Howson and Howson.

Patented May 20, 1952

2,597,436

UNITED STATES PATENT OFFICE 2,597,436

MOTOR CONTAINING WHEEL

Emile Bobard, Beaune, France

Original application March 15, 1945, Serial No. 582,881, now Patent No. 2,483,177, dated September 27, 1949. Divided and this application July 26, 1949, Serial No. 106,883. In France June 3, 1942

Section 1, Public Law 690, August 8, 1946
Patent expires June 3, 1962

1 Claim. (Cl. 180—10)

My invention has for its object improvements in those wheels which are associated with a motor located inside the rim of a wheel the disc of which is asymmetrically arranged with reference to the rolling plane of the rim, said motor being mounted so as to remain stationary with reference to the rotary rim.

These improvements are intended to make the mounting of the wheel easier with reference to all various types of vehicle frames.

In my copending application Ser. No. 582,881, now Patent 2,483,177, granted September 27, 1949, of which this application is a division, I have considered three different ways for mounting the wheel on the frame of the vehicle, the object of the present application is another way for mounting the wheel so as to arrange the latter on the frame of the vehicle according to the processes disclosed in said application The adjoining drawing, given by way of example, will make this specification clearer.

Fig. 1 is a diagrammatical section of the wheel mounted on a vehicle provided with a support fork.

Fig. 2 is a view similar to Fig. 1 showing the wheel mounted on a shaft integral with the frame of the vehicle The motor containing wheel is of the usual type having a solid disc offset with reference to the rim. The disc is shown at 1, the rim at 2 and the usual tire at 3.

In conformity with my copending application Ser. No. 582,881, the motor shaft 4 is offset with reference to the wheel axis while remaining parallel thereto and transmitting its power to said wheel axis through the agency of a pinion 5 and of a gear wheel 6 integral with the disc 1. This wheel 6 is housed inside a fluid tight casing 7 arranged in the innermost part of the wheel—i. e. as near as possible to the disc 1.

This casing 7 is extended to form a tubular part 7a which serves for mounting the wheel on the vehicle frame as disclosed hereinafter.

The wheel 6 is fixed to a hollow shaft 10a, rigid with the wheel as it rotates with respect to a tubular shaft 8 or hub, through which is secured the mounting on the frame of the vehicle and to which is fixed, at 9, the tubular extension 7a.

The hollow shaft 10a rotates with relation to the tube, through the agency of rolling members 11.

As can be seen on Fig. 1, this tubular shaft 8 or hub allows for the easy setting of the wheel between the two arms 12a and 12b of the fork, by engagement of a bolt 13 with a nut 14 into said tubular shaft, the rotative locking being secured by means of a key 15 engaged in a flange 16 rigid with the tubular shaft 8.

As shown by Fig. 2, the wheel can also be so fitted as to be overhung to the extremity of a shaft 17, forming part of the frame of a vehicle. This fixation will be very simply ensured, by engagement of the tubular shaft 8 on the fixed shaft 17 with a nut 14, the rotative locking being secured by means of a key 15 engaged in a flange 16 rigid with the tubular shaft 8.

It should be noted that the disposition of the wheels, as above described, would also make possible a mounting, the reverse of that illustrated in Fig. 2, namely comprising a wheel-disc 1 turned outwardly. In such a case, the tubular member 8 will be preferably cylindrical.

What I claim is:

A vehicle wheel comprising a rim, a wheel disc asymmetrically arranged with reference to the rolling plane of the rim, a hollow rotary shaft for the wheel, a gear wheel rigidly secured thereto and rigid with the wheel disc, a protective casing surrounding said gear wheel and integral with a tubular extension for said casing surrounding said hollow rotary shaft, a tubular hub for said hollow rotary shaft rigid with said tubular extension, bearing means between said hub and rotary shaft, an axle member affixed to the vehicle frame and received within said tubular hub to facilitate mounting on said vehicle, and means fixed relative to the frame and preventing rotation of said tubular hub, a driven shaft lying parallel with said rotary shaft and a pinion on said driven shaft drivingly engaging said gear wheel on said rotary shaft.

EMILE BOBARD.

REFERENCES CITED

The following references are of record in the file of this patent:

UNITED STATES PATENTS

| Number | Name | Date |
|---|---|---|
| 297,973 | Devine | May 6, 1884 |
| 1,249,676 | Seaman | Dec. 11, 1917 |
| 2,483,177 | Bobard | Sept. 27, 1949 |